United States Patent

Shimotashiro et al.

Patent Number: 5,490,181
Date of Patent: Feb. 6, 1996

[54] TIMING RECOVERING APPARATUS HAVING WINDOW PERIODS DETERMINED BY PERIOD OF CLOCK SIGNAL

[75] Inventors: Masafumi Shimotashiro; Kiyokazu Hashimoto; Yoshio Higashida, all of Osaka; Koichi Hayashi, Takamatsu, all of Japan

[73] Assignee: Matsushita Electric Industrial Co., Inc., Osaka, Japan

[21] Appl. No.: 391,295

[22] Filed: Feb. 21, 1995

Related U.S. Application Data

[63] Continuation-in-part of Ser. No. 936,458, Aug. 28, 1992, abandoned.

[30] Foreign Application Priority Data

Sep. 3, 1991 [JP] Japan ..................... 3-222620

[51] Int. Cl.[6] ............................. H03D 3/24; H04L 25/49
[52] U.S. Cl. ............................................. 375/375; 375/293
[58] Field of Search ..................... 375/371, 373, 375/374, 375, 376, 286, 290, 293, 294; 360/51

[56] References Cited

U.S. PATENT DOCUMENTS

| | | | |
|---|---|---|---|
| 4,888,564 | 12/1989 | Ishigaki | 375/120 |
| 5,003,555 | 3/1991 | Fujiyama | 375/120 |

FOREIGN PATENT DOCUMENTS

0365257  4/1990  European Pat. Off. .

OTHER PUBLICATIONS

"Application of Partial-response Channel Coding to Magnetic Recording Systems" by H. Kobayashi et al, IBM J. Res. Develop. Jul. 1970, pp. 368–375.

"Optimum discrimination of digitized signal" by M. Yamashita, et al. pp. 28–31 (w/ partial English translation).
"NRZI, interleaved MRZI mark" by Y. Eto, et al, pp. 35–45 (w/ partial English translation).
Electronicom '85 vol. 1, 6 Oct. 1985, Toronto, pp. 178–180, R. Gangopadhyay et al 'clock recovery of distorted MRZ signal in an optical receiver employing avalanche photodetector'.
Comsat Technical Review vol 15, No. 2B, 1985, Washington US, pp. 423–432, C. J. Wolejsza et al '120–Mbit/s TDMA modem and FEC codec performance'.
Custom Integrated Circuits Conference No. 7.2, May 1989, San Diego, California, pp. 712–724, R. S. Co et al 'a differential PLL architecture for high speed data recovery'.

*Primary Examiner*—Stephen Chin
*Assistant Examiner*—Hai H. Phan
*Attorney, Agent, or Firm*—Lowe, Price, LeBlanc & Becker

[57] ABSTRACT

A timing recovering apparatus comprises an equalizer for equalizing a digital data signal subjected to interleaved NRZI such that the digital data signal has partial response (1, 0, −1), two comparators for comparing the equalized data signal with two different reference levels, two phase comparing portions for detecting phase difference between the outputs of the comparators and a reproduced clock signal separately, an adder for summing the outputs of the phase comparators, and a VCO for generating the reproduce clock signal in accordance with the output of the adder. This timing recovering apparatus performs phase comparing with two different phase comparators and PLL control is performed on the sum of the outputs of the two different phase comparators, so that the clock signal is not affected by data pattern of the data signal. An automatic slice apparatus comprises the equalizer for equalizing a digital data signal subjected to interleaved NRZI, and two comparators supplied with reference levels, and the timing recovering apparatus, detects amplitude of the output of the equalizer in response to the reproduced clock signal to compensate the reference levels.

11 Claims, 9 Drawing Sheets

T : PERIOD OF CLOCK SIG

TIMING RECOVERING APPARATUS HAVING WINDOW PERIODS DETERMINED BY PERIOD OF CLOCK SIGNAL

This application is a continuation in part of application Ser. No. 07/936,458 filed Aug. 28, 1992 which is now abandoned.

BACKGROUND OF THE INVENTION

1. Field of the Invention

This invention relates to a timing recovering apparatus for recovering timing of received data signal and to an automatic slice apparatus for detecting the data signal by comparing the data signal with a reference level controlled, and particularly relates to a timing recovering apparatus used in a digital magnetic reproducing apparatus for reproducing a video signal or a sound signal and to an automatic slice apparatus used in a digital magnetic reproducing apparatus for reproducing a video signal or a sound signal.

2. Description of the Prior Art

A timing recovering apparatus for recovering timing of received data signal used in a digital magnetic reproducing apparatus for reproducing a video signal or a sound signal after a/d conversion is known. Such timing recovering apparatus is used for recovering timing of interleaved NRZI (I-NRZI) coded digital data signal. In the timing recovering apparatus, the reproduced or transmitted interleaved NRZI coded digital data signal is supplied to an equalizer circuit for frequency-compensating to produce a data signal having partial response waveform, hereinafter referred to as PR (1, 0,−1). The equalized data signal shows a three-valued eye pattern, that is, it shows three levels (1, 0, and −1), that is, it is represented by three-valued notation. The equalized data signal is compared with two different reference levels by comparators. A logic circuit detects change in logic level of outputs of the comparators and a clock generation circuit produces a reproduced clock signal with timing of the receive data signal recovered.

An automatic slice apparatus for detecting the data signal by comparing the data signal with reference levels controlled in accordance with a magnitude of the output of the equalizer is known. It is used in a digital magnetic recording apparatus and a digital magnetic reproducing apparatus. Such automatic slice apparatus detects the received digital data signal by comparing such that the reference level is controlled to the center level of the eye pattern of the received data signal to effect accurate comparison. Such comparison reduces fluctuation in amplitude of received digital data signal. Such fluctuation may be developed at a magnetic head for reading a recorded data signal. Such automatic slice apparatus can used together with the timing recovering circuit mentioned above. In this case, the automatic slice circuit generates two different reference levels for comparing the equalized data signal having partial response waveform.

Figure 6:
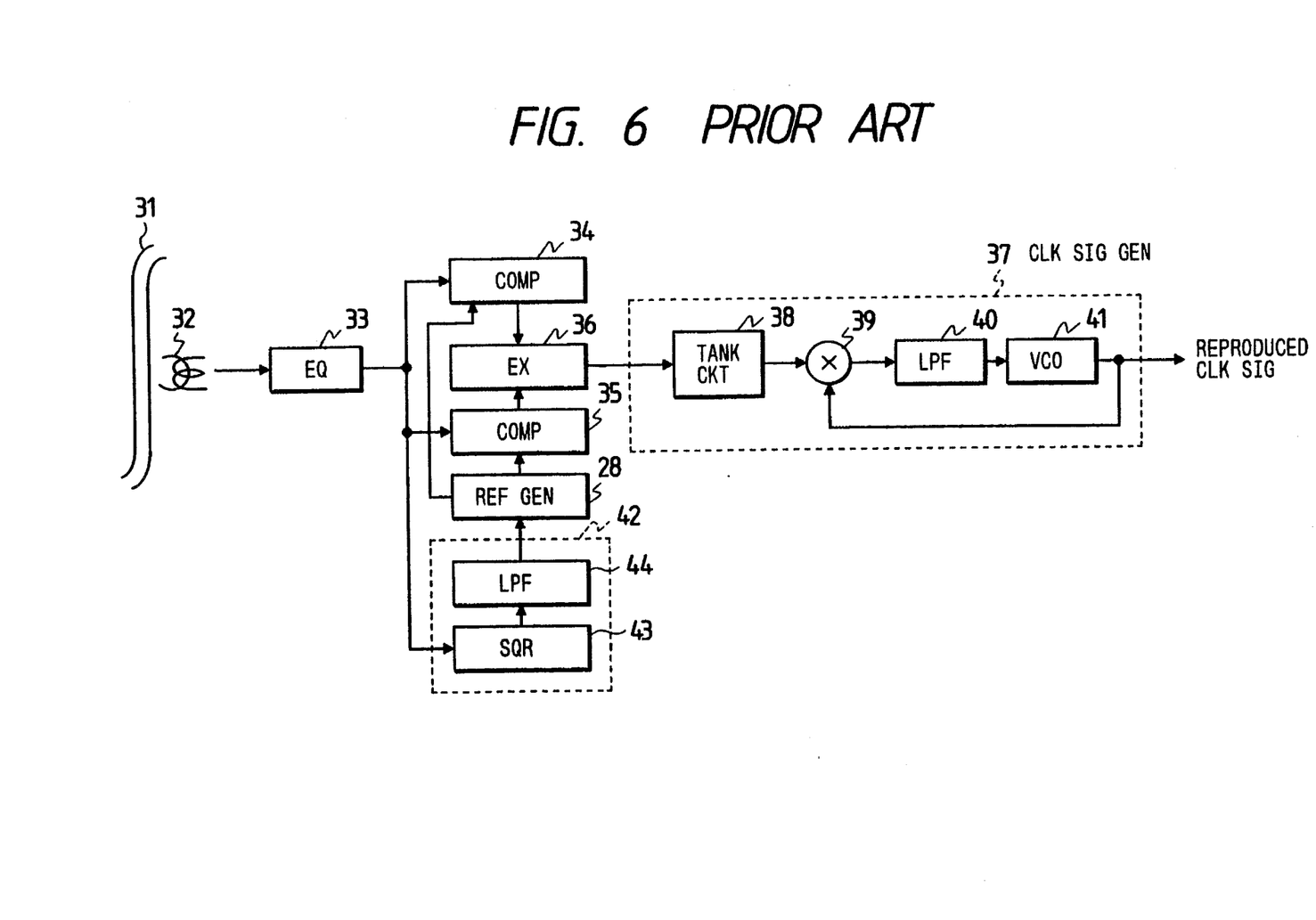
FIG. 6 is a block diagram of a prior art timing recovering apparatus having a prior art automatic slice circuit.

FIG. 6 is a block diagram of a prior art timing recovering apparatus having a prior art automatic slice circuit. FIGS. 7A to 7F show waveforms for explaining a prior art timing recovering apparatus.

A digital data signal reproduced from a magnetic recording medium 31 by a magnetic head 32 is applied to an equalizing circuit 33 for frequency-compensating the received data signal to produce a data signal having partial response (PR) waveform. The equalized data signal shows three-valued eye pattern. The equalized data signal is compared by comparing circuits 34 and 35. Comparing circuits 34 and 35 have different reference levels C1 and C2 shown in FIG. 7A to discriminate the equalized data signal into three level ranges with their binary outputs. The comparing circuit 35 having the reference level C2 outputs an inverted output such that a level of −1 is outputted as 1. The binary outputs from the comparator 34 and 35 are inputted to an Exclusive OR circuit 36 for effecting Exclusive OR operation.

A clock signal generation circuit 37 for detecting bit phase, comprises a tank circuit 38, multiplier 39, low-pass filter (LPF) 40, and a voltage controlled oscillator (VCO) 41. In response to edge portions of the binary output of the Exclusive OR 36, the tank circuit 38 generates a clock signal whose frequency corresponds to the reproduced clock signal of the timing recovering circuit. The output signal of the tank circuit 38 is applied to a phase locked loop (PLL) circuit including the multiplier 39, low-pass filter 40 and the voltage controlled oscillator 41. Therefore, the phase locked loop circuit outputs the clock signal with timing recovered from the received digital data signal.

Figure 7A:
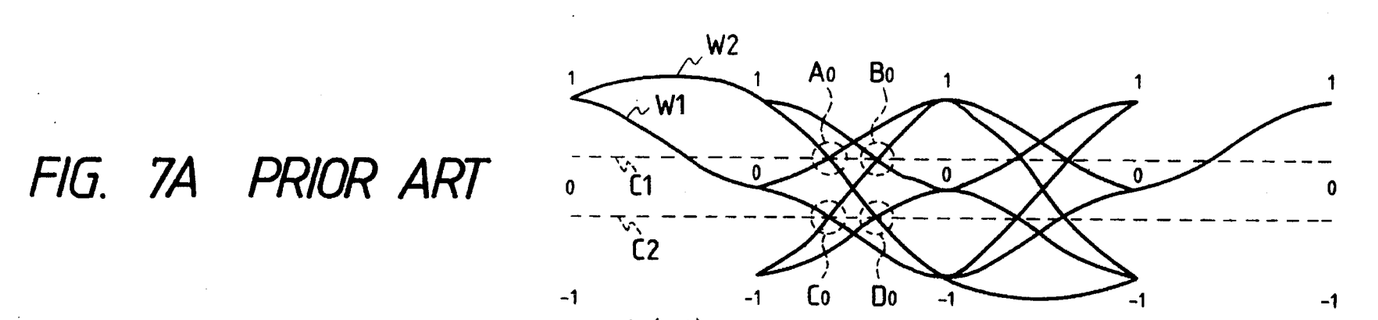
FIGS. 7A to 7F show waveforms for explaining a prior art timing recovering apparatus.
Figure 7B:
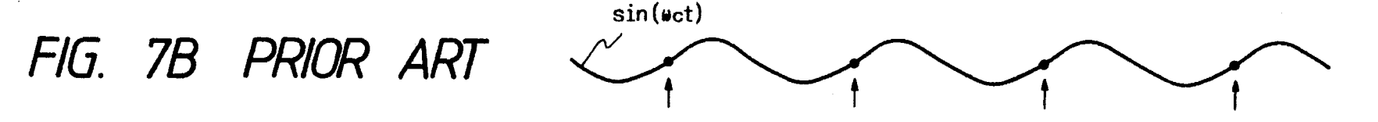

In this prior art timing recovering circuit, a phase of the output of the tank circuit 38 may change in accordance with pattern of data. FIG. 7A shows eye pattern of the output of the equalizer 36, the eye pattern being to be discriminated into three values. In FIG. 7A, the output of the equalizer 36 is normally discriminated at timings A0, B0, C0, and D0 with the same possibility substantially, so that the the tank circuit 38 generates a sine signal as shown in FIG. 7B with phases of respective waves of the sine signal ($\omega_o t$) averaged.

Figure 7C:
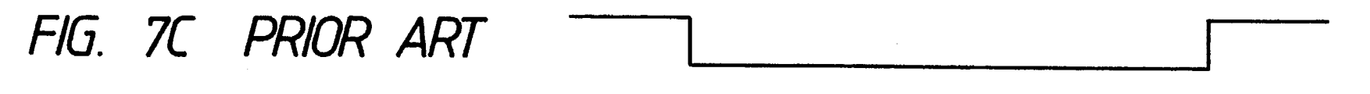
Figure 7D:
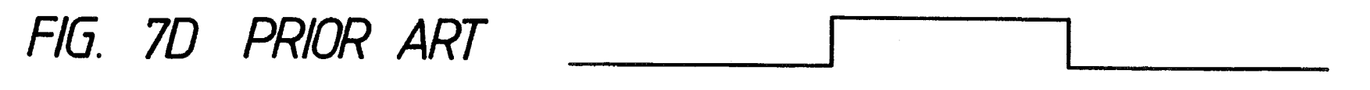
Figure 7E:
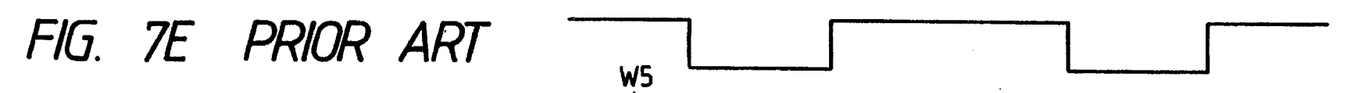
Figure 7F:
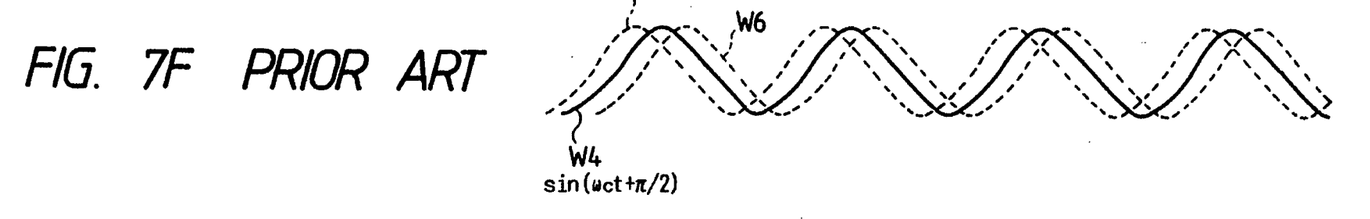
Figures 8A, 8B, 8C:
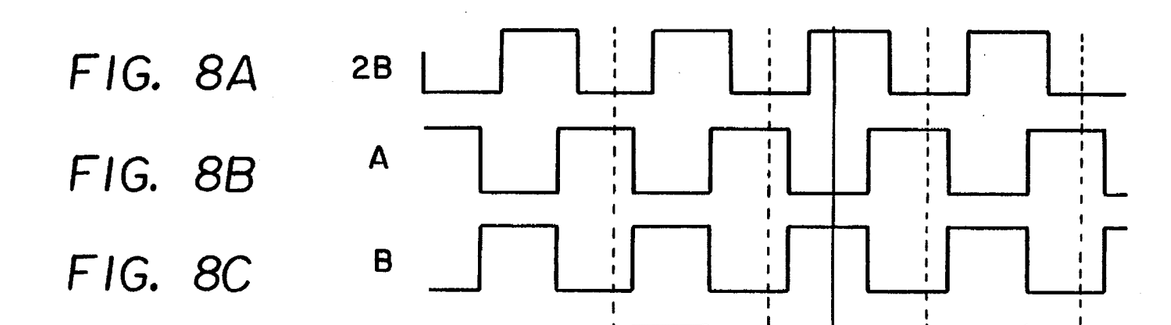
FIG. 8 shows a number of waveforms useful in understanding the present invention.
Figure 8D:
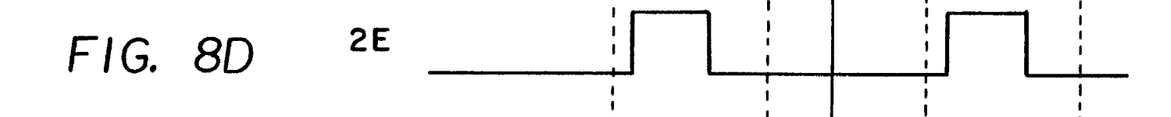
Figure 8E:
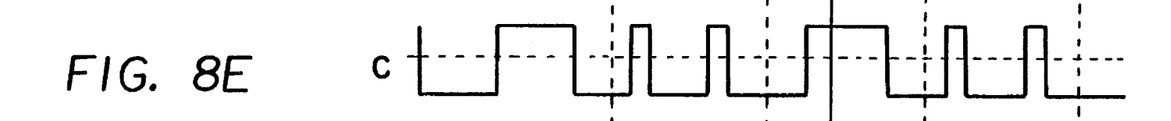
Figure 8F:
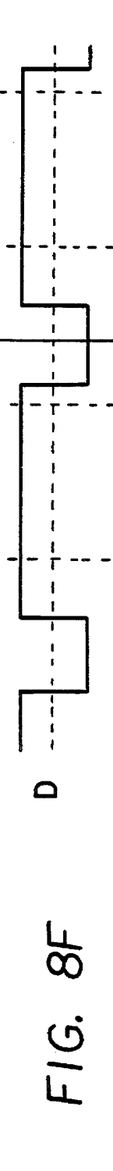
Figure 8G:
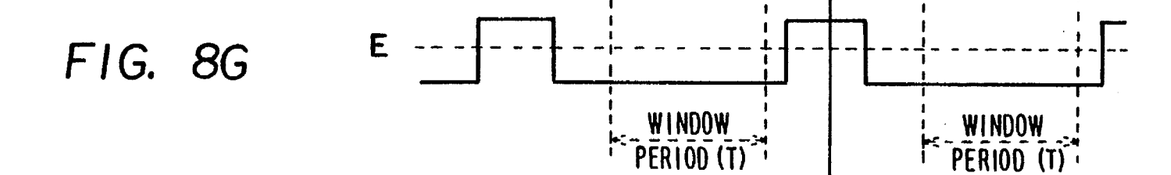

However, when the data signal indicative of a specific data pattern, that is, a waveform W1 represented by (1, 0, −1, 0, 1) of three-valued notation, is inputted repeatedly to the prior art timing recovering circuit, the output of the Exclusive OR circuit 36 outputs a signal shown in FIG. 7E because the output of the comparing circuit 34 shows a waveform shown in FIG. 7C and the output of the comparing circuit 35 shows a waveform shown in FIG. 7D.

Accordingly, the tank circuit 38 would output a signal represented by waveform W5 in response to falling edges of the output of the Exclusive OR circuit 36. On the other hand, the tank circuit 38 would output a signal represented by waveform W6 in response to rising edges of the output of the Exclusive OR circuit 36. In fact, due to averaging, the tank circuit 38 outputs a signal represented by a waveform W4, that is, a signal of sin ($\omega_o t + \pi/2$). This signal represented by the waveform W4 is different in phase by $\pi/2$ from the waveform shown in FIG. 7B, so that bit slip occurs. That is, bias of data pattern causes phase shift of the reproduced clock signal, so that there is a problem that bit synchronizing cannot be obtained accurately by this prior art timing recovering circuit.

In FIG. 6, an automatic slice circuit 42 controls a reference level for the comparing circuits 34 and 35 in accordance with a detected amplitude of the output of the equalizer 33. The output of the equalizer 33 is applied to a squaring circuit 43 for detecting an absolute amplitude of the output of the equalizer 33 which is sent to a low-pass filter 44 for removing high frequency component to produce the reference level. The reference level is sent to a reference signal generation circuit 28 for generating the reference levels C1 and C2 for the comparing circuits 34 and 35. Comparing circuits 34 and 35 discriminate the received data signal into three-valued notation from the reference level.

This automatic slice circuit 42 causes the comparing circuits 34 and 35 to discriminating the received data signal into three-valued notation with variation in amplitude of the output of the equalizer 33 caused by the magnetic head 32.

However, because the pass band of the received data signal is limited to obtain partial response (1, 0, −1) in this system, bias of data pattern causes variation in amplitude at the output of the equalizer 33. For example, a data pattern represented by a waveform W2 indicated by three-value notation (1, 1, −1, −1) shown in FIG. 7A shows such variation.

Therefore, there is a problem that the reference level for comparing is inaccurate due to bias of data pattern of the received data signal in this prior art automatic slice circuit 42. Moreover, there is a further problem that such prior art automatic slice circuit 42 is adversely affected by external noises because such prior art automatic slice circuit has an open-loop structure, or feedforward structure.

SUMMARY OF THE INVENTION

The present invention has been developed in order to remove the above-described drawbacks inherent to the conventional timing recovering apparatus and automatic slice apparatus.

According to the present invention there is provided A timing recovering apparatus comprising: an equalizing portion for equalizing a digital data signal such that the digital data signal has partial response (1, 0, −1); first and second comparators for comparing an output of the equalizing means with first and second reference levels respectively, the first and second reference levels being different from each other; first and second clock signal shaping circuits for shaping outputs of the first and second comparator respectively; first phase comparators for detecting phase difference between a reproduced clock signal with an output of the first clock signal shaping circuit; a second phase comparator for detecting phase difference between the reproduced clock signal with an output of the second clock signal shaping circuit; an adder for adding an output of the first phase comparator to an output of the second phase comparator; a low-pass filter for low-pass filtering an output of the adder; and a VCO (voltage controlled oscillator) for generating the reproduced clock signal with frequency thereof controlled in accordance with an output of the low-pass filter.

According to the present invention there is also provided a timing recovering apparatus comprising: an equalizing portion for equalizing a digital data signal such that the digital data signal has partial response (1, 0, −1); first and second comparators for comparing an output of the equalizing portion with first and second reference levels respectively, the first and second reference levels being different from each other; first and second clock signal shaping circuits for shaping outputs of the first and second comparators respectively; an adder for linearly adding an output of the first clock signal shaping circuit to an output of the second clock signal shaping circuit; a phase comparator, comprising an analog multiplier, for detecting phase difference between a reproduced clock signal with an output of the adder; a low-pass filter for low-pass filtering an output of the adder; and a VCO for generating the reproduced clock signal with frequency thereof controlled in accordance with an output of the low-pass filter.

According to the present invention there is further provided an automatic slice circuit apparatus comprising, an equalizing portion for equalizing a digital data signal such that the digital data signal has partial response (1, 0, −1); first and second comparators for comparing an output of the equalizing portion with first and second reference levels respectively, the first and second reference levels being different from each other; a timing recovering circuit responsive to outputs of the first and second comparators for generating a clock signal with time base of the data signal recovered; first and second data sampling circuit for sampling the output of the first and second comparators respectively; a subtractor for subtracting an output of second data sampling circuit from an output of the first data sampling circuit; and a multiplier for multiplying an output of the equalizing portion by an output of the subtractor; and a level generating circuit for generating the first and second reference levels in accordance with an output of the multiplier.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
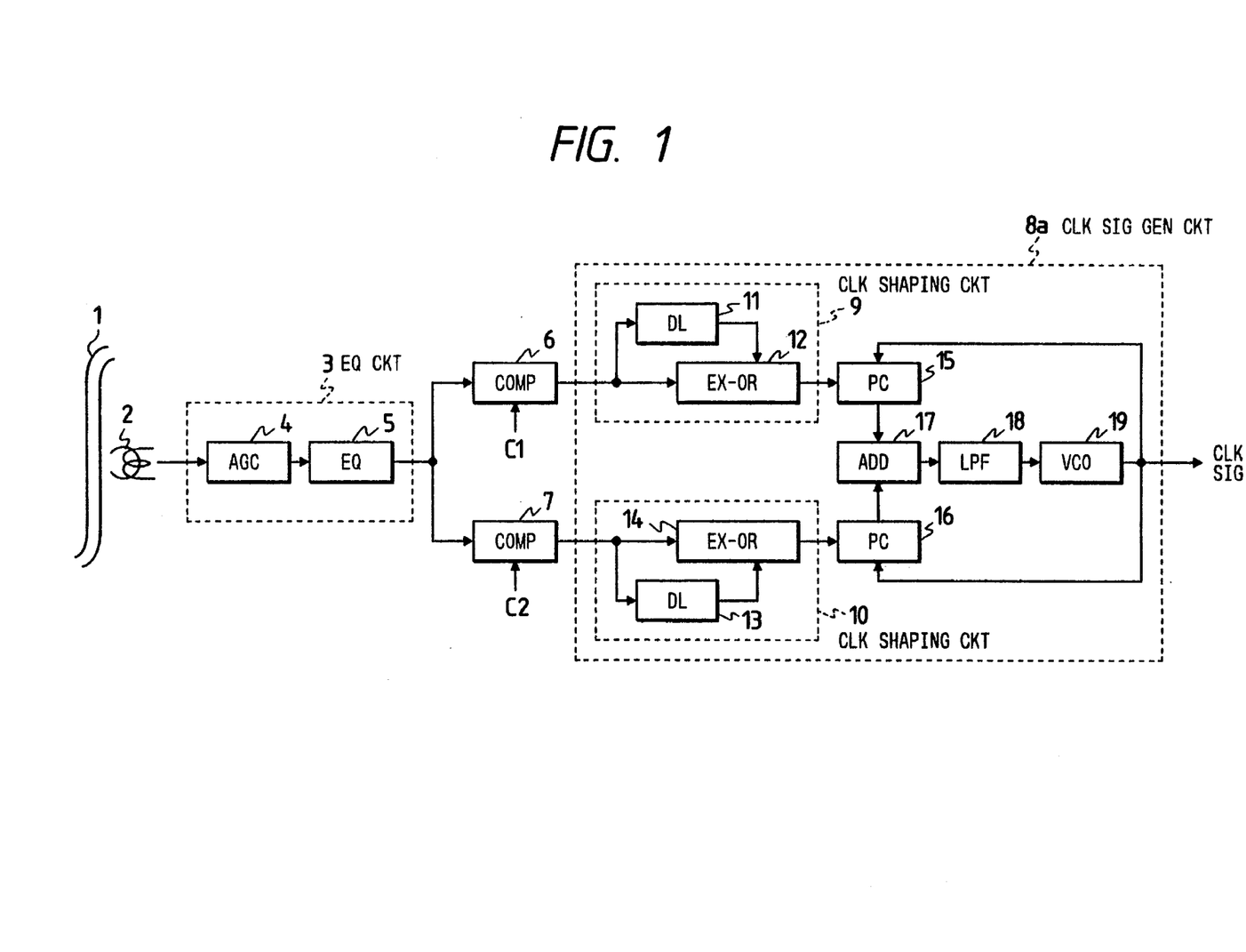
FIG. 1 is a block diagram of the first embodiment of this invention of timing recovering circuit.
Figure 2A:
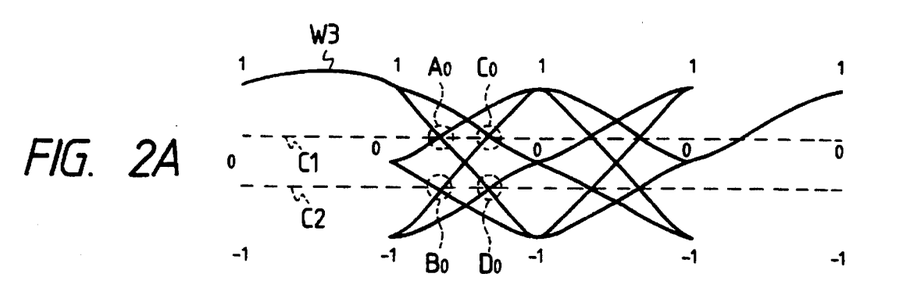
FIGS. 2A to 2F shows waveforms at respect points of the timing recovering circuit shown in FIG. 1.

FIG. 1 is a block diagram of the first embodiment of this invention of timing recovering circuit. FIGS. 2A to 2F shows waveforms at respective points of the timing recovering circuit shown in FIG. 1. A video signal and a sound signal is recorded on the magnetic recording medium 1 after a/d conversion and I-NRZI (interleaved nonreturn to zero inversion). A data signal reproduced from the magnetic recording medium 1 by a magnetic head 2 is applied to an equalizing circuit 3 comprising an AGC circuit 4 and equalizer 5. The reproduced data signal is inputted to the AGC circuit 4 for amplifying the reproduced data signal with automatic gain controlled. An output of the AGC circuit 4 is supplied to equalizer 5 for frequency-compensating the received data signal to produce a data signal having partial response waveform, PR (1, 0, −1). The equalized data signal shows three-valued eye pattern as shown in FIG. 2A.

The equalized data signal is compared by comparators 6 and 7. Comparators 6 and 7 are supplied with different reference levels C1 and C2 respectively as shown in FIG. 2A to discriminate the equalized data signal into three level ranges with their two binary outputs. The comparator 7 supplied with the reference level C2 outputs an inverted output such that a level of −1 is outputted as 1. The binary output of the comparator 6 is inputted to a clock shaping circuit 9 of a clock signal generation circuit 8a. The binary output of the comparator 7 is inputted to a clock shaping circuit 10. The clock shaping circuit 9 comprises an Exclusive-OR circuit 12 responsive to the binary output of the comparator 6 and a delay circuit 11 for delaying the binary output by a half of a period T of clock signal, i.e., (T/2), to supply the delayed binary signal to the another input of the Exclusive OR circuit 12.

The clock shaping circuit 10 has the same structure as the clock shaping circuit 9. That is, the clock shaping circuit 10 comprises an Exclusive-OR circuit 14 responsive to the binary output of the comparator 7 and delay circuit 13 for delaying the binary output by a half of a period T of clock signal, i.e., (T/2), to supply the delayed binary signal to the another input of the Exclusive OR circuit 13. The Exclusive OR circuit 12 effects Exclusive-OR operation between the binary output of the comparator 6 and the delayed binary output form the delayed circuit 11 in order to shape the binary output to enable phase comparing by the PLL (phase locked loop) circuit of the next stage. Similarly, the Exclusive OR circuit 14 effects Exclusive-OR operation between the binary output of the comparator 7 and the delayed binary output form the delay circuit 13.

An output of the clock shaping circuit 9 is applied to a phase comparator 15 for comparing the output of the clock shaping circuit 9 with an output of voltage controlled oscillator (VCO) 19, that is, the reproduced clock signal. An output of the clock shaping circuit 10 is applied to a phase comparator 16 for comparing the output of the clock shaping circuit 10 with the reproduced clock signal. An output of the phase comparator 15 is added to an output of the phase comparator 16 by an adder 17. An output of the adder is sent to the voltage controlled oscillator 19 through a low-pass filter 18 with high frequency component removed. That is, the phase comparators 15 and 16, the adder 17, the low-pass filter 18, and the voltage controlled oscillator 19 form a phase locked loop responsive to binary outputs from the comparators 6 and 7 for generating a clock signal whose timing recovered.

Hereinbelow will described operation of the timing recovering circuit of this embodiment with reference to FIGS. 2A to 2F.

FIG. 2A shows waveforms of the output of the equalizing circuit 3 in the form of eye pattern to be discriminated into three-valued notation, where "1" and "−1" denote amplitudes at synchronized clock timings and references C1 and C2 denote the reference levels of the comparators 6 and 7 respectively. FIGS. 2B to 2F show waveforms of outputs at respective points in the clock signal generation circuit 8 when the received data signal including data pattern is shown by a waveform W3 represented by three-valued notation (1, 1, −1, 0). Therefore, the binary output of the comparator 6 shows a waveform shown in FIG. 2C and the binary output of the comparator 7 shows a waveform shown in FIG. 2D wherein the comparator 7 supplied with the reference level C2 outputs an inverted output such that a level of −1 is outputted as 1. The binary outputs of the comparators 6 and 7 are shaped by the clock shaping circuits 9 and 10 respectively. Therefore, the output of the clock shaping circuit 9 shows a waveform shown in FIG. 2E and the output of the clock shaping circuit 10 shows a waveform shown in FIG. 2F. There is a relation between the clock signal outputted from the voltage controlled oscillator 19 and the binary outputs of the comparators 6 and 7 is such that one edge of the binary signals of the comparators 6 and 7 corresponds to one period of the clock signal shown in FIG. 2B. Therefore, PLL control can be obtained from the output of the VCO 19. The phase comparators 15 and 16 comprise Exclusive OR circuits. Thus, it will be appreciated that the phase comparators 15 and 16 compare the reproduced clock signal with the first and second phase signals to obtain first and second window periods, whose durations are determined by a period of the clock signal of the data signal to be reproduced and the outputs of the comparators 6 and 7. The window periods are effectively used for detecting phase differences between the reproduced clock signal and the first and second phase signals, thus to recover the timing of the clock signal of the data signal having a partial response waveform from the equalizing circuit 3. The adder 17 adds the output of the phase comparator 15 to the output of the phase comparator 16 through analog processing. The added phase signal from the adder 17 is filtered by the low-pass filter 18. The VCO 19 oscillates in accordance with the output of the low-pass filter 18 and outputs the clock signal with timing of the received data signal recovered.

Because the equalizing circuit 3 effects frequency compensation to obtain partial response (1, 0, −1), both cross points A0 and D0 or both cross points B0 and C0 in the three-valued eye pattern always exist in any data pattern of the received data signal and phase difference between these cross points. Moreover, the clock signal is the same and if either cross point of a pair of cross points A0 and D0 or B0 and C0 shows lead, the other cross point of the pair shows lag of the same amount. Therefore, this phase relation is averaged by the adder 17 summing the outputs of the phase comparators 15 and 16.

Figure 2B:
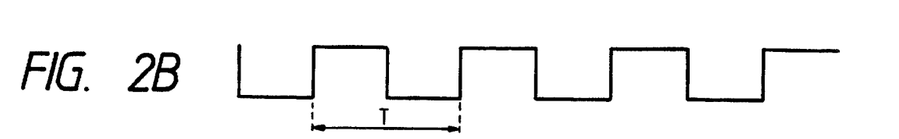
Figure 2C:
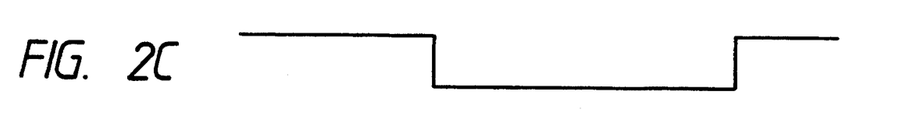
Figure 2D:
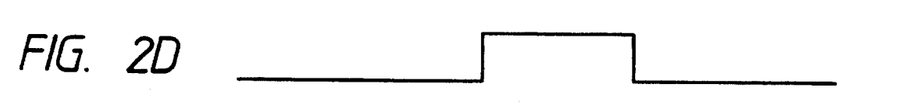
Figure 2E:
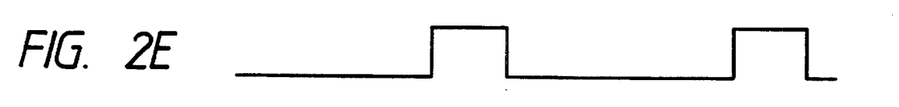
Figure 2F:
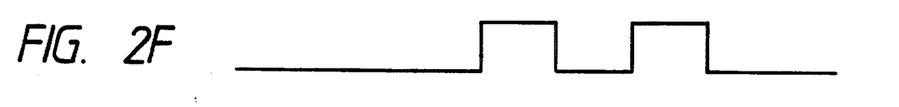

More specifically, comparing the waveforms in FIG. 2B with FIGS. 2E and 2F, phase difference between rising edges in FIG. 2B and rising edges in FIG. 2E agrees with that between rising edges in FIG. 2B and rising edges in FIG. 2F but polarities of these phase differences have an inverted relation. Therefore, the averaging of these phase differences provides accurate phase control to the phase locked loop, so that the VCO 19 generates the lock signal accurately. The foregoing comparison is further appreciated from the waveforms shown in FIG. 8. Therein, the first waveform repeats the waveform of FIG. 2B, showing the reproduced clock signal. Waveform A of FIG. 8 shows a waveform of the reproduced clock signal which, for purposes of explanation, is shown as being shifted relative to the waveform of the clock signal waveform of FIG. 2B. Waveform B of FIG. 8 also shows a waveform of the clock signal which is shifted relative to the waveform of the clock signal of FIG. 2B, and which has a phase difference of 180° from waveform A. The fourth waveform repeats the waveform of FIG. 2E, showing the waveform of the output of the clock signal shaping circuit 9, i.e., the phase signal. Waveform C of FIG. 8 shows a waveform of an output of the phase comparator 15 which, as hereinabove described, comprises an Exclusive-OR circuit for executing an Exclusive-OR operation between the reproduced clock signal (FIG. 2B) and the output of the clock signal shaping circuit 9 reproduced in FIG. 2E. Waveform D of FIG. 8 shows the output of the phase comparator 15, showing the result of the Exclusive-OR operation between the reproduced clock signal shown in waveform A and the output of the clock signal shaping circuit 9 in FIG. 2E. Waveform E of FIG. 8 shows the output of the phase comparator 15, showing the result of the Exclusive OR operation between the reproduced clock signal shown in waveform B and the output of the clock signal shaping circuit in FIG. 2E.

As will be appreciated by one of ordinary skill, waveforms C to E demonstrate that, in periods other than the window periods, the output of the LPF 18 will be zero volts if a duty ratio of the reproduced clock signal is 50%. That is, the output level of the LPF 18 changes in accordance with the waveform in the window period.

Figure 9:
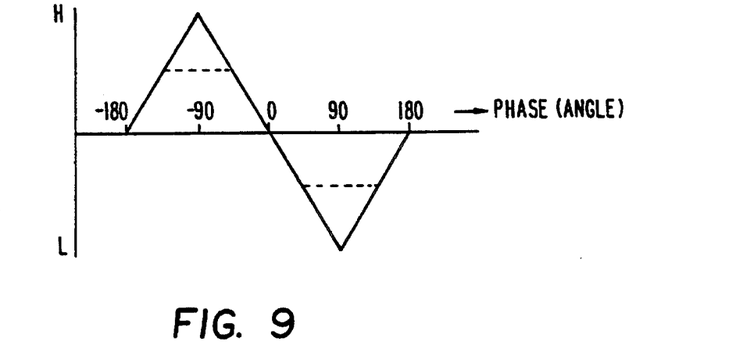
FIG. 9 shows an output of a lowpass filter in the embodiment of FIG. 1.
Figure 10A:
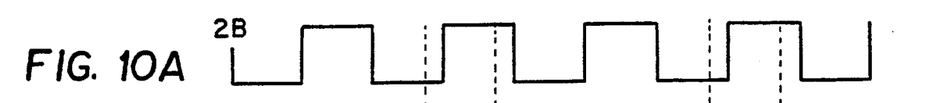
FIG. 10 shows a number of waveforms useful in understanding the invention.
Figure 10B:
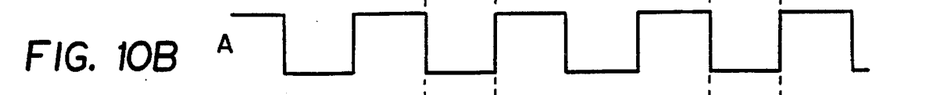
Figure 10C:
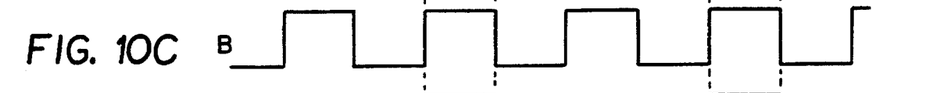
Figure 10D:
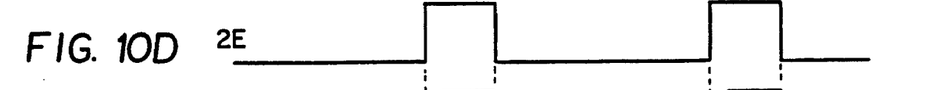
Figure 10E:
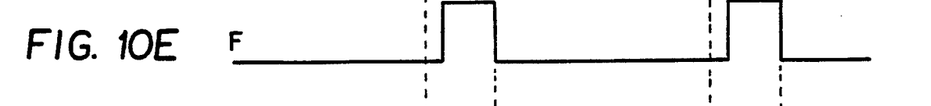
Figure 10F:
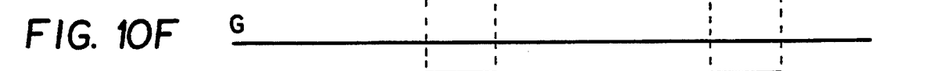
Figure 10G:
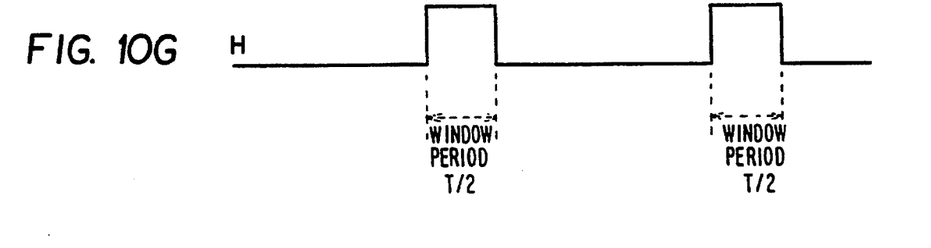

In other words, the phase information is provided in the window period. In the case of the waveform shown at D, the output level of the LPF 18 is a maximum. In the case of the waveform shown at E, the output level of the LPF 18 is a minimum. In the case of the waveform shown at C, the output level of the LPF 18 shows some level. FIG. 9 shows the output of the lowpass filter 18 indicative of a relation between a phase in angle between the output of the clock shaping circuit 9 or 10 (as shown in FIG. 2E) and the reproduced clock signal (shown in FIG. 2B). The lowpass filter 18 integrates the outputs of phase comparators 15 and 16. For example, the lowpass filter 18 integrates the output of the phase comparator 15 represented by the wave forms at FIGS. C, D, or E of FIG. 8. A voltage level of the output of the lowpass filter 18 represents H periods within the window period of T in waveforms C, D, or E. Therefore, the output of the lowpass filter 18 provides a phase control signal for the VCO 19.

From the foregoing description, the phase signal shown in FIG. 2E (the output of clock shaping circuit 9) includes both the phase information and an indication of the window period. In the foregoing description, the window period is one clock period T. However, one half of the clock signal period, that is, the H period of the waveform shown in FIG. 2E, also provides a sufficient window period. This point is described more specifically as follows.

In order to detect the phase relation between the reproduced clock and the outputs of the clock shaping circuits 9 and 10 within the T/2 period, AND gates are used as the phase comparators 15 and 16. FIG. 10 shows a number of waveforms useful in understanding the present invention when an AND gate is used as the phase comparator. The first to fourth waveforms (labelled 2B, A, B and 2E) repeat waveforms of FIG. 8. Waveform F shows an output of the AND gate, that is, an AND operation between the first and fourth waveforms 2B and 2E. Waveform G shows an output of the AND gate, that is, an AND operation between the waveforms A and 2E. Waveform H shows an output of the AND gate, that is, an AND operation between the waveforms B and 2E. As shown in waveforms F, G, and H, the pulse widths provided by the AND gates represent the phase relation between the reproduced clock signal and the output of the phase comparator 15. Therefore, the phase control signal outputted by the lowpass filter 18 which integrates the output of the phase comparator (having the waveforms shown at F, G, or H) also provides the phase controlling between the reproduced clock signal and the input signal.

Moreover, when the reproduced data signal from the magnetic head 2 varies in magnitude, cross points A0 and D0 or cross points B0 and C0 deviate because the reference levels C1 and C2 are constant in this timing recovering circuit. However, relations between the cross points A0 and D0 or B0 and C0 are constant, so that the averaging of phase differences detected by the phase comparators 15 and 16 removes the variation of magnitude of the reproduced data signal.

Figure 3:
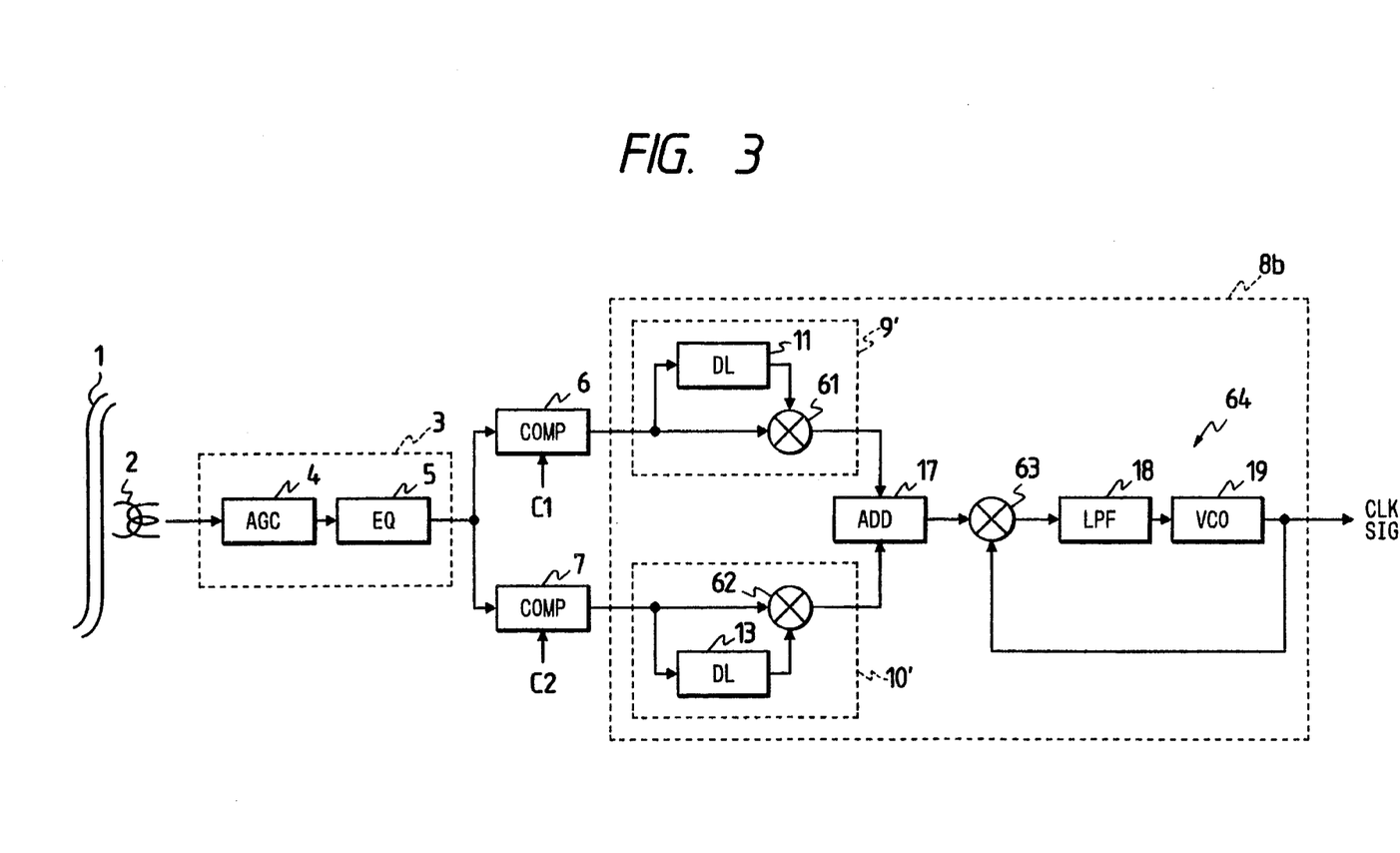
FIG. 3 is a block diagram of a second embodiment.

FIG. 3 is a block diagram of a second embodiment. The second embodiment is a modified embodiment of the first embodiment. In the clock shaping circuits 9 and 10 of the first embodiment, the binary output form the comparator 6 and 7 are shaped by the Exclusive OR circuit 12 and 14. However, in this modified embodiment, shaping is effected by analog multipliers 61 and 62 of clock shaping circuits 9' and 10' in a clock signal generation circuit 8b. The output of the analog multiplier 61 is added to the output of the analog multiplier 62 linearly by the adder 17. Feedback of a PLL circuit 64 is executed by an analog multiplier 63 for multiplying the output of the adder 17 with the output of the VC0 19 to form phase locked loop. This structure also provides the same function as that of the first embodiment.

Hereinbelow will be described an embodiment of this invention of an automatic slice apparatus with reference to drawings.

Figure 4:
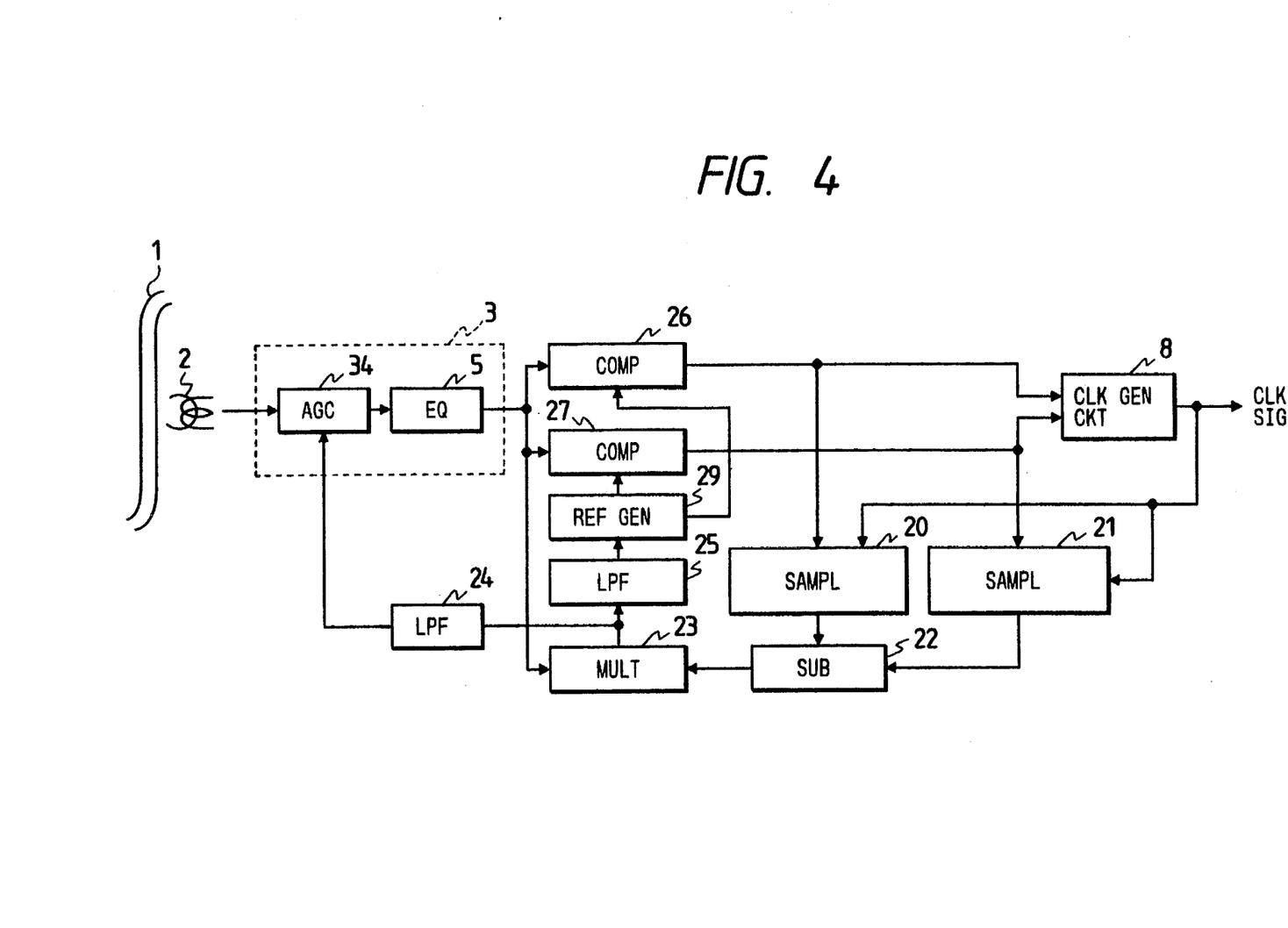
FIG. 4 is a block diagram of an embodiment of automatic slice circuit.

FIG. 4 is a block diagram of the embodiment of automatic slice circuit where the same elements are designated as the same references as FIG. 1.

A video signal and a sound signal is recorded on the magnetic recording medium 1 after a/d conversion and I-NRZI. A data signal reproduced from the magnetic recording medium 1 by a magnetic head 2 is an equalizing circuit 3 comprising an AGC circuit 34 and equalizer 5. The reproduced data signal is inputted to the AGC circuit 34 for amplifying the reproduced data signal with automatic gain controlled. An output of the AGC circuit 34 is supplied to equalizer 5 for frequency-compensating the received data signal to produce a data signal having partial response waveform, PR (1, 0, −1). The equalized data signal shows three-valued eye pattern.

The equalized data signal is compared by comparators 26 and 27. The comparators 26 and 27 discriminate the equalized data signal into three level ranges with their two binary outputs. The comparator 7 outputs an inverted output such that a level of −1 is outputted as 1. The binary outputs of the comparing circuits 6 and 7 are inputted to a clock signal generation circuit 8 which correspond to or the same as the clock signal generation circuit 8a or 8b described in the first embodiment. The clock signal generation circuit 8 outputs a clock signal with timing of the received data signal recovered.

Figure 5A:
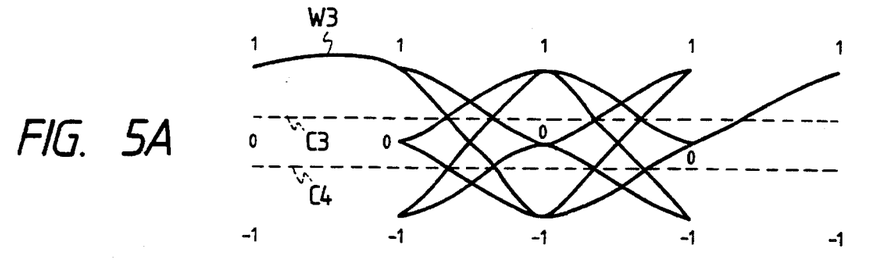
FIGS. 5A to 5G show waveforms of outputs at respective points shown in FIG. 4.
Figure 5B:
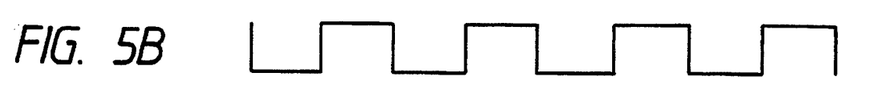
Figure 5C:
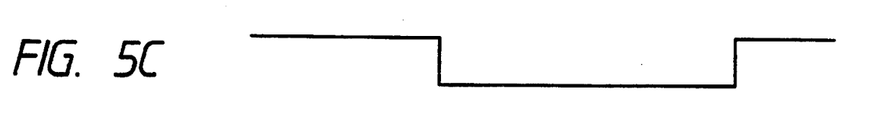
Figure 5D:
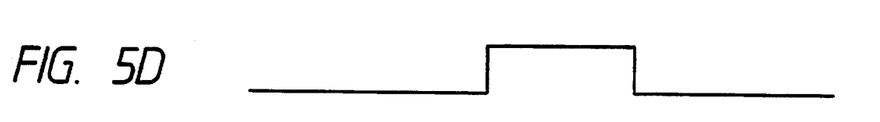
Figure 5E:
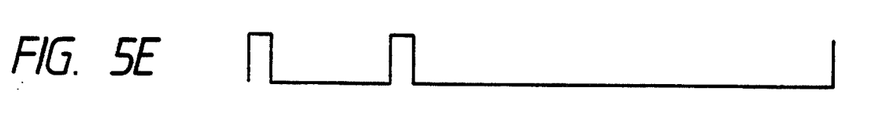
Figure 5F:
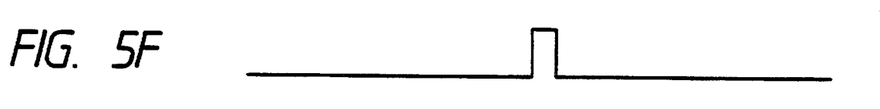
Figure 5G:
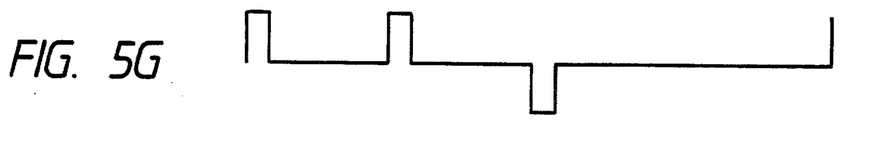

Data sampling circuit 20 samples the binary signal from the comparator 26 in response to the clock signal from the clock signal generation circuit 8. Data sampling circuit 21 samples the binary signal from the comparator 7 in response to the clock signal from the clock signal generation circuit 8. FIGS. 5A to 5F show waveforms of outputs at respective points of this embodiment when the received data signal including data pattern shown by a waveform W3 represented by three-valued notation (1, 1, −1, 0). Therefore, the binary output of the comparator 26 shows an waveform shown in FIG. 5C when the comparator 26 compares the output of the equalizing circuit 3 with the reference level C3. The binary output of the comparator 27 shows a waveform shown in FIG. 5D when the comparing circuit 27 is supplied with the reference level C4. The comparator 27 outputs an inverted output such that a level of −1 is outputted as 1. The data sampling circuits 20 and 21 sample the binary outputs of the comparators 26 and 27 at rising edges of the clock signal shown in FIG. 5B, so that they output signals showing waveforms shown in FIGS. 5E and 5F respectively. Outputs of the data sampling circuits 20 and 21 are sent to a subtractor 22 for subtracting the output of the data sampling circuit 20 from the output of the data sampling circuit 21 as shown in FIG. 5G. The waveform of FIG. 5G is indicative of both bit synchronizing timing and polarity of three-valued data signal shown in FIG. 5A.

An output of the subtractor 22 is sent to a multiplier 23. The multiplier 23 multiplies the output of the subtractor 22 by the output of the equalizing circuit 3. Therefore, the multiplier 23 detects level of the reproduced data signal at the bit synchronizing timing. This means that the level of the reproduced data signal is constant irrespective of data pattern of the reproduce data signal because the output of the equalizing circuit having partial response (1, 0, −1) except that the level of the reproduced data signal varies. In other words, the multiplier 23 can detect variation in amplitude of the reproduced data signal accurately.

A low-pass filter 24 extracts amplitude variation components from the output of the multiplier 23. An output of the low-pass filter 24 is sent to the AGC circuit 34 to compensate the amplitude of the received data signal by feedback control. Therefore, the variation of the reproduced data signal is largely compensated and remaining variation is detected by the low-pass filters 24 and 25. Therefore, the low-pass filter 25 detects the remaining variation. The detected variation is fed to a reference signal generation circuit 29 for generating the reference level C3 and C4 in accordance with the detected variation, that is, the output to the low-pass filter 25. The reference levels C3 and C4 controlled by the detected variation are sent to the comparators 26 and 27 respectively. The comparator 26 compares the output of the equalizing circuit 3 with the reference level C3. The comparator 27 compares the output of the equalizing circuit 3 with the reference level C4. This compensation of the variation of the data signal is feedfoward control.

Therefore, the this control can respond the variation quickly, so that the remaining variation in the amplitude of the data signal can be compensated considerably.

Moreover, a large part of variation in amplitude of the data signal is compensated by the AGC 34, so that it is not necessary to assign a large dynamic range to the reference levels C3 and C4 of the comparators 26 and 27 and thus, this cause the comparators 26 and 27 to withstand external noises.

Moreover, the clock generation circuit 8 can generate the clock signal indicative of bit synchronizing without affection of the variation of amplitude of the data signal. Therefore, the clock generation circuit 8 and the automatic slice circuit can be treated as independent loop.

Further, in FIG. 4, the low-pass filter 24 and 25 are provided separately. However, only one low-pass filter can provide the detection of variation in amplitude of the data signal.

What is claimed is:

1. A timing recovering apparatus comprising:
   (a) equalizing means for equalizing a digital data signal such that said digital data signal has partial response (1, 0, −1);
   (b) first and second comparing means for comparing an output of said equalizing means with first and second reference levels respectively, said first and second reference levels being different from each other;
   (c) first and second phase signal producing means for producing first and second phase signals representing first and second phases of outputs of said first and second comparing means and first and second window periods having durations determined by a period of a clock signal of a data signal to be reproduced in response to outputs of said first and second comparing means, respectively;
   (d) first phase comparing means for detecting a phase difference between a reproduced clock signal and said first phase signal for said first window period;
   (e) second phase comparing means for detecting a phase difference between said reproduced clock signal and said second phase signal for said second window period;
   (f) adding means for adding an output of said first phase comparing means to an output of said second phase comparing means;
   (g) low-pass filter means for low-pass filtering an output of said adding means; and
   (h) oscillation means for generating said reproduced clock signal with frequency thereof controlled in accordance with an output of said low-pass filter means.

2. A timing recovering apparatus as claimed in claim 1, wherein each of said first and second phase signal producing means comprises means for changing a level thereof for half of said period of a clock signal of said data signal to be reproduced.

3. A timing recovering apparatus as claimed in claim 2, wherein said first phase signal producing means comprises delay means for delaying said output of said first comparing means by half of said period of a clock signal of said data signal to be reproduced and Exclusive-OR means for performing an Exclusive-OR operation between said output of said first comparing means and an output of said delay means.

4. A timing recovering apparatus as claimed in claim 3, wherein said second phase signal producing means comprises second delay means for delaying said output of said second comparing means by half of said period of a clock signal of said data signal to be reproduced and second Exclusive-OR means for performing an Exclusive-OR operation between said output of said second comparing means and an output of said second delay means.

5. A timing recovering apparatus as claimed in claim 1, wherein each of said first and second window periods corresponds to one period of a clock signal of said data signal to be reproduced.

6. A timing recovering apparatus comprising
   (a) equalizing means for equalizing a digital data signal such that said digital data signal has partial response (1, 0, −1);
   (b) first and second comparing means for comparing an output of said equalizing means with first and second reference levels respectively, said first and second reference levels being different from each other;
   (c) first and second phase signal producing means for producing first and second phase signals indicating first and second phase information for outputs of said first and second comparing means and first and second window periods having lengths determined by a period of a clock signal of a data signal to be reproduced in response to outputs of said first and second comparing means, respectively;
   (d) adding means for linearly adding said phase signal and said second phase signal;
   (e) phase comparing means, comprising an analog multiplier, for detecting a phase difference between a reproduced clock signal and an output of said adding means for said first and second window periods;
   (f) low-pass filter means for low-pass filtering an output of said adding means; and
   (h) oscillation means for generating said reproduced clock signal with frequency thereof controlled in accordance with an output of said low-pass filter means.

7. A timing recovering apparatus as claimed in claim 6, wherein each of said first and second phase signal producing means comprises means for changing a level thereof for half of said period of a clock signal of said data signal to be reproduced.

8. A timing recovering apparatus as claimed in claim 7, wherein said first phase signal producing means comprises delay means for delaying said output of said first comparing means by half of said period of a clock signal of said data signal to be reproduced and an analog multiplier for multiplying said output of said first comparing means and an output of said delay means.

9. A timing recovering apparatus as claimed in claim 8, wherein said second phase signal producing means comprises second delay means for delaying said output of said second comparing means by half of said period of a clock signal of said data signal to be reproduced and an analog multiplier for multiplying said output of said second comparing means and an output of said second delay means.

10. A timing recovering apparatus as claimed in claim 6, wherein each of said first and second window periods corresponds to one period of a clock signal of said data signal to be reproduced.

11. A timing recovering apparatus comprising:

(a) equalizing means for equalizing a digital data signal such that said digital data signal has partial response (1, 0, −1);

(b) first and second comparing means for comparing an output of said equalizing means with first and second reference levels respectively, said first and second reference levels being different from each other;

(c) first and second clock signal shaping means for producing first and second signals, having durations corresponding to a half of a period of a clock signal of said data signal, at edges of outputs of said first and second comparing means, respectively;

(d) first phase comparing means for detecting a phase difference between a reproduced clock signal and said first signal;

(e) second phase comparing means for detecting a phase difference between said reproduced clock signal and said second signal;

(f) adding means for adding an output of said first phase comparing means to an output of said second phase comparing means;

(g) low-pass filter means for low-pass filtering an output of said adding means; and (h) oscillation means for generating said reproduced clock signal with frequency thereof controlled in accordance with an output of said low-pass filter means.

\* \* \* \* \*